US012260740B2

(12) United States Patent
Dearden et al.

(10) Patent No.: US 12,260,740 B2
(45) Date of Patent: Mar. 25, 2025

(54) SELF-TESTING FIRE SENSING DEVICE

(71) Applicant: Honeywell International Inc., Charlotte, NC (US)

(72) Inventors: Christopher Dearden, Melton Mowbray (GB); Michael Barson, Nuneaton (GB); Benjamin Wolf, Leicester (GB)

(73) Assignee: Honeywell International Inc., Charlotte, NC (US)

( * ) Notice: Subject to any disclaimer, the term of this patent is extended or adjusted under 35 U.S.C. 154(b) by 26 days.

(21) Appl. No.: 18/241,282

(22) Filed: Sep. 1, 2023

(65) Prior Publication Data

US 2024/0038054 A1 Feb. 1, 2024

Related U.S. Application Data

(60) Division of application No. 17/184,056, filed on Feb. 24, 2021, now Pat. No. 11,749,097, which is a (Continued)

(51) Int. Cl.

*G08B 29/14* (2006.01)
*G08B 17/107* (2006.01)
*G08B 17/117* (2006.01)

(52) U.S. Cl.

CPC .......... *G08B 29/145* (2013.01); *G08B 17/107* (2013.01); *G08B 17/117* (2013.01)

(58) Field of Classification Search

CPC .. G08B 29/145; G08B 17/107; G08B 17/117; G08B 29/043; G08B 29/046; G08B 17/103; G08B 17/10

See application file for complete search history.

(56) References Cited

U.S. PATENT DOCUMENTS 3,343,044 A 9/1967 King, Jr. et al.
4,531,114 A * 7/1985 Topol ........................ A62B 3/00 340/533

(Continued)

FOREIGN PATENT DOCUMENTS

CA 1119269 A 3/1982
CN 101537236 A 9/2009

(Continued)

OTHER PUBLICATIONS

Extended Search Report from related EP Application No. 20189064.7, dated Feb. 11, 2021 (11 pages).

(Continued)

*Primary Examiner* — Curtis J King
(74) *Attorney, Agent, or Firm* — Brooks, Cameron & Huebsch, PLLC

(57) ABSTRACT

Devices, methods, and systems for a self-testing fire sensing device are described herein. One device includes an adjustable particle generator and a variable airflow generator configured to generate an aerosol density level sufficient to trigger a fire response without saturating an optical scatter chamber and the optical scatter chamber configured to measure a rate at which the aerosol density level decreases after the aerosol density level has been generated, determine an airflow rate from an external environment through the optical scatter chamber based on the measured rate at which the aerosol density level decreases, and determine whether the self-testing fire sensing device is functioning properly based on the fire response and the determined airflow rate.

20 Claims, 4 Drawing Sheets

Related U.S. Application Data continuation of application No. 16/552,301, filed on Aug. 27, 2019, now Pat. No. 11,132,891.

(56) References Cited

U.S. PATENT DOCUMENTS

| | | | | |
|---|---|---|---|---|
| 4,827,244 | A * | 5/1989 | Bellavia | G08B 29/145 340/630 |
| 5,450,066 | A * | 9/1995 | Brighenti | G08B 17/06 340/596 |
| 5,611,620 | A * | 3/1997 | Wantz | G08B 29/145 374/1 |
| 5,617,079 | A * | 4/1997 | Harrison | G08B 17/00 429/96 |
| 5,670,946 | A * | 9/1997 | Ellwood | G08B 29/145 340/630 |
| 5,923,260 | A | 7/1999 | Endo et al. | |
| 5,936,533 | A | 8/1999 | Bernal et al. | |
| 6,015,230 | A * | 1/2000 | Wantz | G08B 29/145 374/1 |
| 6,225,910 | B1 * | 5/2001 | Kadwell | G08B 29/043 340/630 |
| 7,934,411 | B2 * | 5/2011 | Koch | G08B 29/145 73/1.06 |
| 8,205,478 | B1 * | 6/2012 | Hallisey | G08B 29/145 73/1.06 |
| 8,353,625 | B1 * | 1/2013 | Feiter | G08B 29/145 374/121 |
| 8,766,807 | B2 | 7/2014 | Gonzales | |
| 8,933,811 | B2 | 1/2015 | Højmose | |
| 9,659,485 | B2 * | 5/2017 | Piccolo, III | G08B 29/145 |
| 9,959,748 | B2 | 5/2018 | Moffa | |
| 10,783,771 | B2 * | 9/2020 | Penney | G08B 29/145 |
| 11,132,891 | B2 | 9/2021 | Dearden et al. | |
| 11,227,473 | B1 | 1/2022 | Griffith et al. | |
| 2002/0134131 | A1 * | 9/2002 | Pepper | G08B 29/145 73/1.01 |
| 2004/0035179 | A1 * | 2/2004 | Koch | G08B 29/145 374/2 |
| 2005/0212678 | A1 * | 9/2005 | Berg | G08B 5/40 340/425.5 |
| 2007/0194907 | A1 * | 8/2007 | Tawil | G08B 29/14 340/514 |
| 2008/0018485 | A1 * | 1/2008 | Kadwell | G08B 17/107 340/630 |
| 2009/0078065 | A1 * | 3/2009 | Rossiter | G08B 29/145 73/865.6 |
| 2009/0308134 | A1 * | 12/2009 | Pepper | G08B 29/12 73/1.06 |
| 2010/0018723 | A1 | 1/2010 | Bleil et al. | |
| 2014/0168647 | A1 * | 6/2014 | Ju | G08B 17/107 29/527.1 |
| 2015/0302727 | A1 * | 10/2015 | Piccolo, III | G08B 17/107 340/514 |
| 2015/0310732 | A1 * | 10/2015 | Piccolo, III | G08B 29/145 340/515 |
| 2016/0240059 | A1 * | 8/2016 | Stowell | G08B 17/113 |
| 2017/0124829 | A1 * | 5/2017 | Tennies | G08B 17/06 |
| 2017/0287318 | A1 * | 10/2017 | Moffa | G08B 29/043 |
| 2018/0075733 | A1 * | 3/2018 | Brown | G08B 29/145 |
| 2018/0293878 | A1 * | 10/2018 | Penney | B05B 17/0646 |
| 2019/0291866 | A1 * | 9/2019 | Jegodtka | G08B 17/00 |
| 2020/0250963 | A1 | 8/2020 | Rodriguez | |
| 2020/0319154 | A1 * | 10/2020 | Dohi | G01N 33/0016 |
| 2020/0320857 | A1 * | 10/2020 | Lang | G08B 29/145 |
| 2021/0046346 | A1 * | 2/2021 | Fujiwara | G08B 17/113 |

FOREIGN PATENT DOCUMENTS

| | | | |
|---|---|---|---|
| CN | 101763708 | A | 6/2010 |
| CN | 102054322 | A | 5/2011 |
| DE | 1291140 | B | 3/1969 |
| DE | 20215640 | U1 | 2/2003 |
| DE | 102012215212 | A1 | 3/2014 |
| EP | 2320397 | A1 | 5/2011 |
| GB | 2176600 | A | 12/1986 |
| GB | 2459322 | A | 10/2009 |
| WO | 0227293 | A2 | 4/2002 |
| WO | 2017/060716 | A1 | 4/2017 |
| WO | 2017/216539 | A1 | 12/2017 |
| WO | 2018/193086 | A1 | 10/2018 |

OTHER PUBLICATIONS

First Chinese Office Action & Search Report from related Chinese Application No. 202010713357.X, dated Oct. 28, 2021 (Original Document 7 pgs; Translated Copy 10 pgs—17 pgs total).

Second Chinese Office Action for related Chinese Application No. 202010713357.X, dated May 20, 2022 (Original Document 5 pgs; Translated Copy 8 pgs—13 pgs total).

* cited by examiner

SELF-TESTING FIRE SENSING DEVICE

PRIORITY INFORMATION

This application is a Divisional of U.S. application Ser. No. 17/184,056, filed Feb. 24, 2021, which is a Continuation of U.S. application Ser. No. 16/552,301, filed Aug. 27, 2019 and issued as U.S. Pat. No. 11,132,891, on Sep. 28, 2021, the contents of which are incorporated herein by reference.

TECHNICAL FIELD

The present disclosure relates generally to devices, methods, and systems for a self-testing fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

A typical test includes a maintenance engineer using pressurized aerosol to force synthetic smoke into a chamber of a fire sensing device, which can saturate the chamber. In some examples, the maintenance engineer can also use a heat gun to raise the temperature of a heat sensor in a fire sensing device and/or a gas generator to expel carbon monoxide (CO) gas into a fire sensing device. These tests may not accurately mimic the characteristics of a fire and as such, the tests may not accurately determine the ability of a fire sensing device to detect an actual fire.

Also, this process of manually testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fires sensing devices, particularly at a large site. Additionally, it is often the case that many fire sensing devices never get tested because of access issues.

DETAILED DESCRIPTION

Figure 1:
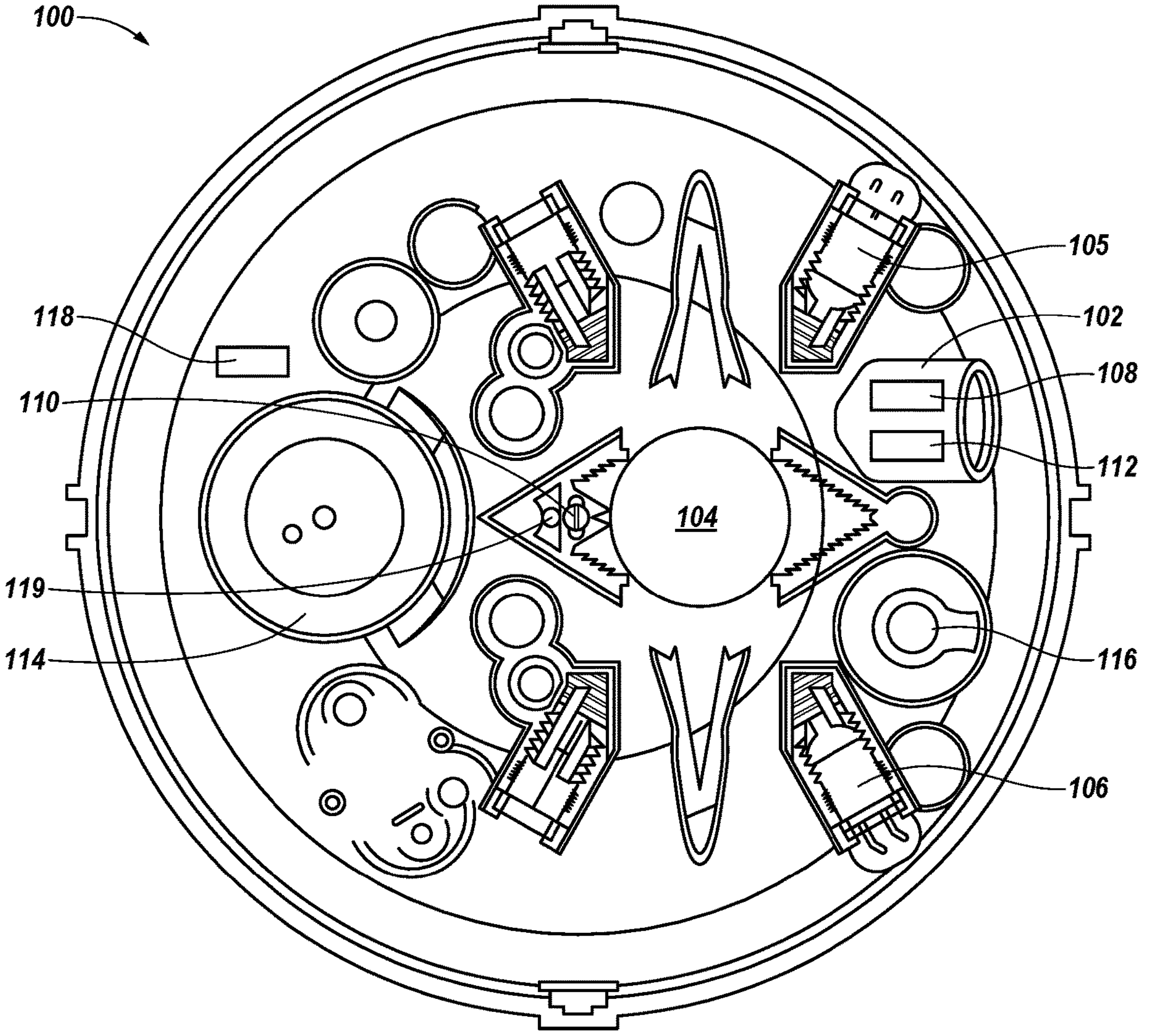
FIG. 1 illustrates an example of a self-testing fire sensing device in accordance with an embodiment of the present disclosure.

Devices, methods, and systems for a self-testing fire sensing device are described herein. One device includes an adjustable particle generator and a variable airflow generator configured to generate an aerosol density level sufficient to trigger a fire response without saturating an optical scatter chamber and the optical scatter chamber configured to measure a rate at which the aerosol density level decreases after the aerosol density level has been generated, determine an airflow rate from an external environment through the optical scatter chamber based on the measured rate at which the aerosol density level decreases, and determine whether the self-testing fire sensing device is functioning properly based on the fire response and the determined airflow rate.

In contrast to previous fire sensing devices in which a maintenance engineer would have to manually test each fire sensing device in a facility (e.g., using pressurized aerosol, a heat gun, a gas generator, or any combination thereof), fire sensing devices in accordance with the present disclosure are self-testing and can more accurately imitate characteristics of a fire. Accordingly, fire sensing devices in accordance with the present disclosure may take significantly less time to test, can be tested continuously and/or on demand, and can more accurately determine the ability of a fire sensing device to detect an actual fire.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates an example of a self-testing fire sensing device 100 in accordance with an embodiment of the present disclosure. The self-testing fire sensing device 100 can be, but is not limited to, a fire and/or smoke detector of a fire control system.

A fire sensing device 100 (e.g., smoke detector) can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A self-testing fire sensing device 100 can automatically or upon command conduct one or more tests contained within the fire sensing device 100. The one or more tests can determine whether the self-testing fire sensing device 100 is functioning properly.

As shown in FIG. 1, fire sensing device 100 can include an adjustable particle generator 102, an optical scatter chamber 104 including a transmitter light-emitting diode (LED) 105 and a receiver photodiode 106, a heat source 108, a heat sensor 110, a gas source 112, a gas sensor 114, a variable airflow generator 116, a proximity sensor 118, and an additional heat source 119. In some examples, a fire sensing device 100 can also include a microcontroller including memory and/or a processor, as will be further described in connection with FIGS. 2-4.

The adjustable particle generator 102 of the fire sensing device 100 can generate particles which can be mixed into a controlled aerosol density level by the variable airflow generator 116. The aerosol density level can be a particular level that can be detected by an optical scatter chamber 104. In some examples, a fire response can be triggered in response to the optical scatter chamber 104 detecting the aerosol density level. Once the aerosol density level has reached the particular level, the adjustable particle generator 116 can be turned off and the variable airflow generator 116 can increase the rate of airflow through the optical scatter chamber 104. The variable airflow generator 116 can increase the rate of airflow through the optical scatter chamber 104 to reduce the aerosol density level back to an initial level of the optical scatter chamber 104 prior to the adjustable particle generator 116 generating particles. For example, the variable airflow generator 116 can remove the aerosol from the optical scatter chamber 104 after it is determined whether the fire sensing device 100 is functioning properly. If the fire sensing device 100 is not blocked or covered, then airflow from the external environment through the optical scatter chamber 104 will cause the aerosol density level to decrease. The rate at which the aerosol density level decreases after the aerosol density level has been generated is proportional to airflow from the external environment through the optical scatter chamber 104, so the optical scatter chamber 104 can measure the airflow to determine whether the sensing device 100 is impeded and whether the sensing device 100 is functioning properly.

The adjustable particle generator 102 can include a reservoir to contain a liquid and/or wax used to create particles. The adjustable particle generator 102 can also include a heat source, which can be heat source 108 or a different heat source. The heat source 108 can be a coil of resistance wire. A current flowing through the wire can be used to control the temperature of the heat source 108 and further control the number of particles produced by the adjustable particle generator 102. The heat source 108 can heat the liquid and/or wax to create airborne particles to simulate smoke from a fire. The particles can measure approximately 1 micrometer in diameter and/or the particles can be within the sensitivity range of the optical scatter chamber 104. The heat source 108 can heat the liquid and/or wax to a particular temperature and/or heat the liquid and/or wax for a particular period of time to generate an aerosol density level sufficient to trigger a fire response from a properly functioning fire sensing device without saturating the optical scatter chamber 104 and/or generate an aerosol density level sufficient to test a fault condition without triggering a fire response or saturating the optical scatter chamber 104. The ability to control the aerosol density level can allow a smoke test to more accurately mimic the characteristics of a fire and prevent the optical scatter chamber 104 from becoming saturated.

The optical scatter chamber 104 can sense the external environment due to a baffle opening in the fire sensing device 100 that allows air and/or smoke from a fire to flow through the fire sensing device 100. The optical scatter chamber 104 can be an example of an airflow monitoring device. In some examples a different airflow monitoring device can be used to measure the airflow through the fire sensing device 100.

As previously discussed, the rate of reduction in aerosol density level can be used to determine an airflow rate from the external environment through the optical scatter chamber 104, and a determination of whether fire sensing device 100 is functioning properly can be made based on the determined air flow rate and/or the fire response. For example, the fire sensing device 100 can be determined to be functioning properly responsive to the airflow rate exceeding a threshold airflow rate and/or a fire response being triggered. In some examples, the fire sensing device 100 can trigger a fault if the airflow rate fails to exceed a threshold airflow rate. For example, the fire sensing device 100 can send a notification of the fault to a monitoring device when an impeded airflow is detected. In some examples, the impeded airflow can be caused by a person deliberately attempting to mask (e.g., cover) the fire sensing device 100.

The fire sensing device 100 can include an additional heat source 119, but may not require an additional heat source 119 if the heat sensor 110 is self-heated. In some examples, heat source 119 can generate heat at a temperature sufficient to trigger a fire response from a properly functioning heat sensor 110. The heat source 119 can be turned on to generate heat during a heat self-test. Once the heat self-test is complete, the heat source 119 can be turned off to stop generating heat.

The heat sensor 110 can normally be used to detect a rise in temperature caused by a fire. Once the heat source 119 is turned off, the heat sensor 110 can measure a rate of reduction in temperature. The rate of reduction in temperature can be proportional to the airflow from the external environment through the fire sensing device 100 and as such the rate of reduction in temperature can be used to determine the airflow rate. The airflow rate can be used to determine whether air is able to enter the fire sensing device 100 and reach the heat sensor 110. The airflow rate can also be measured and used to compensate the generation of an aerosol used to self-test the fire sensing device 100.

A fire response can be triggered responsive to the heat sensor 110 detecting a temperature exceeding a threshold temperature. The fire sensing device 100 can be determined to be functioning properly responsive to the triggering of the fire response and the determined airflow rate.

A fault can be triggered by the fire sensing device 100 responsive to a determined change in temperature over time failing to exceed a threshold temperature change over time. In some examples, the fault can be sent to a monitoring device. The determined change in temperature over time can determine whether the fire sensing device 100 is functioning properly. In some examples, the fire sensing device 100 can be determined to be functioning properly responsive to an airflow rate derived from the determined change in temperature over time exceeding a threshold airflow rate.

A gas source 112 can be separate and/or included in the adjustable particle generator 102, as shown in FIG. 1. The gas source 112 can be configured to release one or more gases. The one or more gases can be produced by combustion. In some examples, the one or more gases can be carbon monoxide (CO) and/or a cross-sensitive gas. The gas source 112 can generate gas at a gas level sufficient to trigger a fire response from a properly functioning fire sensing device and/or trigger a fault in a properly functioning gas sensor 114.

The gas sensor 114 can detect one or more gases in the fire sensing device 100, such as, for example, the one or more gases released by the gas source 112. For example, the gas sensor 114 can detect CO and/or cross-sensitive gases. In some examples, the gas sensor 114 can be a CO detector. Once the gas source 112 is turned off, the gas sensor 114 can measure the gas level and determine the change in gas level over time to determine the airflow rate. The airflow rate can be used to determine whether air is able to enter the fire sensing device 100 and reach the gas sensor 114.

A fire response of the fire sensing device 100 can be triggered responsive to the gas sensor 114 detecting one or more gases and/or one or more gases exceeding a threshold level. The fire sensing device 100 can be determined to be functioning properly responsive to the fire response, the gas sensor 114 detecting the one or more gases and/or the one or more gases exceeding the threshold level and the fire sensing device 100 properly triggering a fire response.

The fire sensing device 100 can be determined to be functioning properly based on the change in the gas level over time. In some examples, the fire sensing device 100 can be determined to be functioning properly responsive to the change in the gas level over time exceeding a threshold gas level change and/or a threshold airflow rate, derived from the determined change in gas level over time, exceeding a threshold airflow rate. The fire sensing device 100 can trigger and/or send a fault responsive to the change in gas level over time failing to exceed the threshold change in gas level and/or the airflow rate failing to exceed the threshold airflow rate. In some examples, the fire sensing device 100 can be determined to be functioning properly responsive to the triggering of a fire response and/or triggering of a fault.

The variable airflow generator 116 can control the airflow through the first sensing device 100, including the optical scatter chamber 104. For example, the variable airflow generator 116 can move gases and/or aerosol from a first end of the fire sensing device 100 to a second end of the fire sensing device 100. In some examples, the variable airflow generator 116 can be a fan. The variable airflow generator 116 can start responsive to the adjustable particle generator 102, the heat source 119, and/or the gas source 112 starting. The variable airflow generator 116 can stop responsive to the adjustable particle generator 102, the heat source 119, and/or the gas source 112 stopping, and/or the variable airflow generator 116 can stop after a particular period of time after the adjustable particle generator 102, the heat source 119, and/or the gas source 112 has stopped.

The fire sensing device 100 can include one or more proximity sensors 118. A proximity sensor 118 can detect objects within a particular distance of the fire sensing device 100, and therefore can be used to detect tampering intended to prevent fire sensing device 100 from functioning properly. For example, the proximity sensor 118 can detect an object (e.g., a hand, a piece of clothing, etc.) placed in front of or on the fire sensing device 100 to impede heat, gas, and/or smoke from entering the optical scatter chamber 104 in an attempt to prevent the triggering of a fire response from the fire sensing device 100. In some examples, a fire response of the fire sensing device 100 can be triggered responsive to the proximity sensor 118 detecting an object within a particular distance of the fire sensing device 100.

Figure 2:
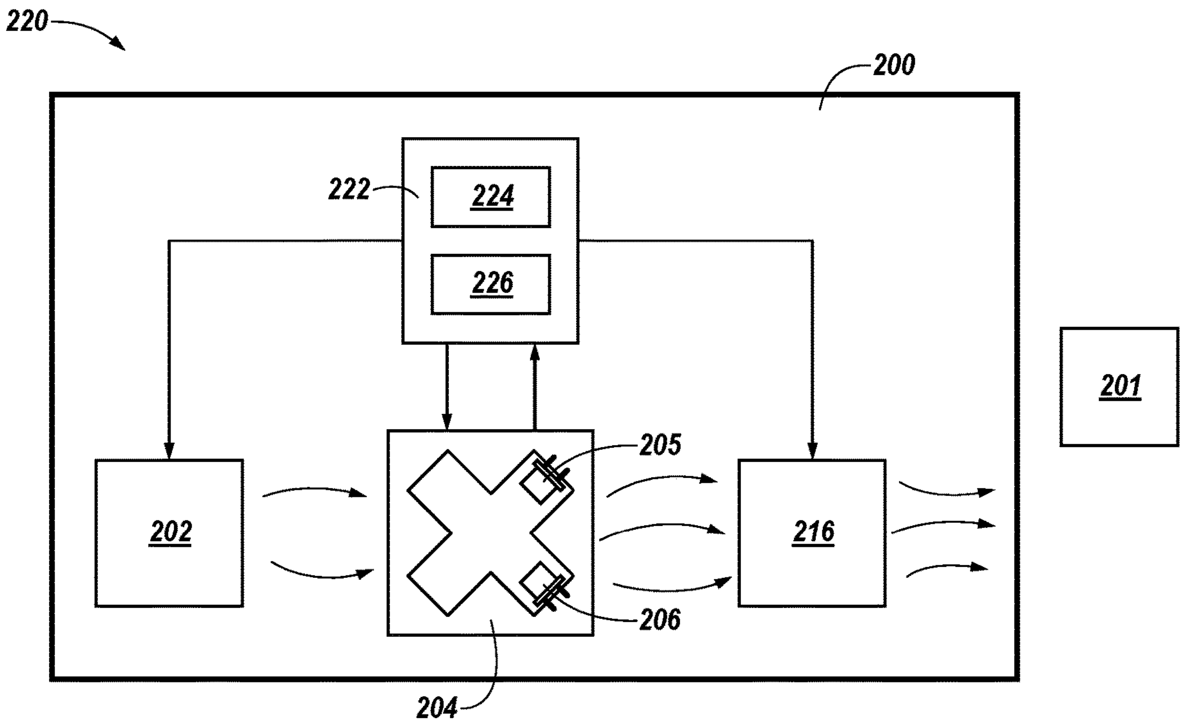
FIG. 2 illustrates a block diagram of a smoke self-test function of a fire sensing device in accordance with an embodiment of the present disclosure.

FIG. 2 illustrates a block diagram of a smoke self-test function 220 of a fire sensing device in accordance with an embodiment of the present disclosure. The block diagram of the smoke self-test function 220 includes a fire sensing device 200 and a monitoring device 201. The fire sensing device 200 includes a microcontroller 222, an adjustable particle generator 202, an optical scatter chamber 204, and a variable airflow generator 216.

The monitoring device 201 can be a control panel, a fire detection control system, and/or a cloud computing device of a fire alarm system. The monitoring device 201 can be configured to send commands to and/or receive test results from a fire sensing device 200 via a wired or wireless network. The network can be a network relationship through which monitoring device 201 can communicate with the fire sensing device 200. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, monitoring device 201 and the fire sensing device 200 via a wired or wireless network.

As used herein, a "network" can provide a communication system that directly or indirectly links two or more computers and/or peripheral devices and allows a monitoring device to access data and/or resources on a fire sensing device 200 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

The microcontroller 222 can include a memory 224 and a processor 226. Memory 224 can be any type of storage medium that can be accessed by processor 226 to perform various examples of the present disclosure. For example, memory 224 can be a non-transitory computer readable medium having computer readable instructions (e.g., computer program instructions) stored thereon that are executable by processor 226 to test a fire sensing device 200 in accordance with the present disclosure. For instance, processor 226 can execute the executable instructions stored in memory 224 to generate a particular aerosol density level, measure the generated aerosol density level, determine an airflow rate from an external environment through the optical scatter chamber 204, and transmit the determined airflow rate. In some examples, memory 224 can store the aerosol density level sufficient to trigger a fire response from a properly firing sensing device, the aerosol density level sufficient to test a fault condition without triggering a fire response, the threshold airflow rate to verify proper airflow through the optical scatter chamber 204, and/or the particular period of time that has passed since previously conducting a smoke self-test function (e.g., generating a particular aerosol density level and measuring the generated aerosol density level).

The microcontroller 222 can execute the smoke self-test function 220 of the fire sensing device 200 responsive to a particular period of time passing since previously conducting a smoke self-test function and/or responsive to receiving a command from the monitoring device 201.

The microcontroller 222 can send a command to the adjustable particle generator 202 to generate particles. The particles can be drawn through the optical scatter chamber 204 via the variable airflow generator 216 creating a controlled aerosol density level. The aerosol density level can be sufficient to trigger a fire response without saturating an optical scatter chamber. The aerosol density level can be measured and the airflow rate can be determined by the optical scatter chamber 204. As shown in FIG. 2, the scatter chamber 204 can include a transmitter light-emitting diode (LED) 205 and a receiver photodiode 206 to measure the aerosol density level.

Once the aerosol density level is measured and/or the airflow rate is determined, the fire sensing device 200 can store the test result (e.g., fire response, aerosol density level, rate at which the aerosol density level decreases after the aerosol density level has been generated, and/or airflow rate) in memory 224 and/or send the test result to the monitoring device 201. In some examples, the fire sensing device 200 can determine whether the fire sensing device 200 is functioning properly based on the test result and/or the monitoring device 201 can determine whether the fire sensing device 200 is functioning properly based on the test result. For example, the monitoring device 201 can determine the fire sensing device 200 is functioning properly responsive to the triggering of a fire response and/or the airflow rate exceeding a threshold airflow rate.

Figure 3:
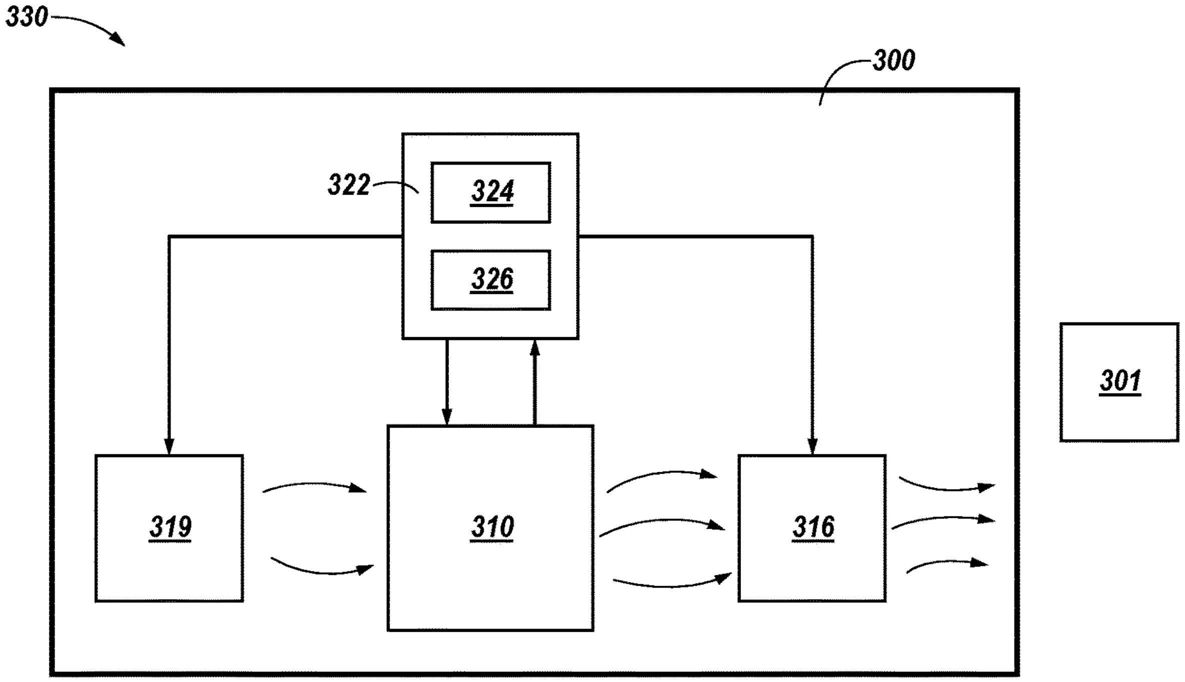
FIG. 3 illustrates a block diagram of a heat self-test function of a fire sensing device in accordance with an embodiment of the present disclosure.

FIG. 3 illustrates a block diagram of a heat self-test function 330 of a fire sensing device in accordance with an embodiment of the present disclosure. The block diagram of the heat self-test function 330 includes a fire sensing device 300 and a monitoring device 301. The fire sensing device 300 includes a microcontroller 322, a heat source 319, a heat sensing element 310, and a variable airflow generator 316.

The microcontroller 322 can include a memory 324 and a processor 326. Memory 324 can be a non-transitory computer readable medium having computer readable instructions (e.g., computer program instructions) stored thereon that are executable by processor 326 to test a fire sensing device 300 in accordance with the present disclosure. For instance, processor 326 can execute the executable instructions stored in memory 324 to generate heat at a temperature sufficient to trigger a fire response using the heat source 319, detect a rise in temperature using the heat sensor 310, turn off the heat source 319, measure a rate of reduction in temperature, and/or determine an airflow rate based on the rate of reduction in temperature. In some examples, memory 324 can store the threshold temperature sufficient to trigger a fire response from a properly functioning heat sensing element 310 and/or the period of time that has passed since previously conducting a heat self-test function (e.g., generating heat, detecting a rise in temperature, turning off the heat source, measuring a rate of reduction in temperature, determining an airflow rate based on the rate of reduction in temperature, and/or transmitting the temperature reading).

The microcontroller 322 can execute the heat self-test function 330 of the fire sensing device 300 responsive to a particular period of time passing since previously conducting a heat self-test function and/or responsive to receiving a command from the monitoring device 301.

The microcontroller 322 can send a command to the heat source 319 to produce heat. The heat can be drawn past the heat sensor 310 via the variable airflow generator 316, the heat source 319 can be turned off, the variable airflow generator 316 can be turned off, the heat sensor 310 can measure a rate of reduction in temperature, and/or determine an airflow rate based on the rate of reduction in temperature. The fire sensing device 300 can store the measured rate of reduction in temperature and/or the determined airflow rate in memory 324 and/or send the test result (e.g., the measured rate of reduction in temperature and/or the determined airflow rate to the monitoring device 301. In some examples, the fire sensing device 300 can determine whether the fire sensing device 300 is functioning properly based on the fire response, the measured rate of reduction in temperature and/or the determined airflow rate and/or the monitoring device 301 can determine whether the fire sensing device 300 is functioning properly based on the measured rate of reduction in temperature and/or the determined airflow rate. For example, the monitoring device 301 can determine the fire sensing device 300 is functioning properly responsive to the measured rate of reduction in temperature exceeding a threshold rate of reduction in temperature and/or the determined airflow rate exceeding a threshold airflow rate.

Figure 4:
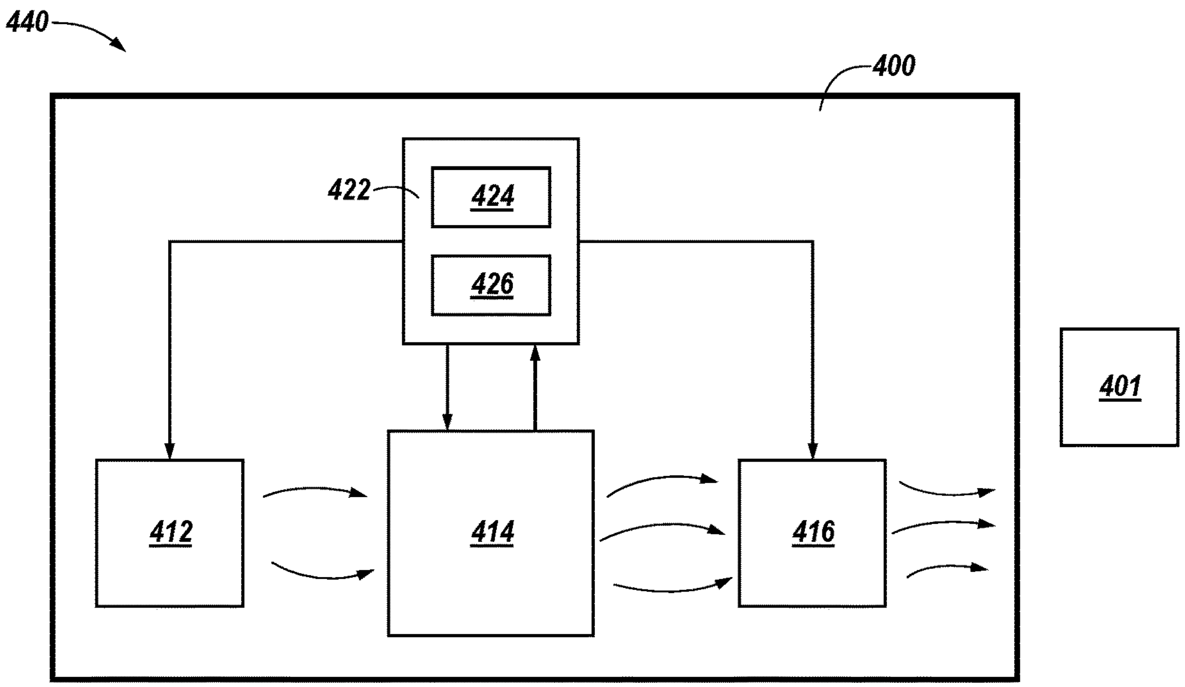
FIG. 4 illustrates a block diagram of a gas self-test function of a fire sensing device in accordance with an embodiment of the present disclosure.

FIG. 4 illustrates a block diagram of a gas self-test function 440 of a fire sensing device 400 in accordance with an embodiment of the present disclosure. The block diagram of the gas self-test function 440 includes a fire sensing device 400 and a monitoring device 401. The fire sensing device 400 includes a microcontroller 422, a gas source 412, a gas sensor 414, and a variable airflow generator 416.

The microcontroller 422 can include a memory 424 and a processor 426. Memory 424 can be a non-transitory computer readable medium having computer readable instructions (e.g., computer program instructions) stored thereon that are executable by processor 426 to test a fire sensing device 400 in accordance with the present disclosure. For instance, processor 426 can execute the executable instructions stored in memory 424 to release one or more gases using the gas source 412 and detect one or more gases using the gas sensor 414. In some examples, memory 424 can store the threshold level of gas sufficient to trigger a fire response from a properly functioning gas sensor 414 and/or the period of time that has passed since previously conducting a gas self-test function 440 (e.g., releasing gas, detecting gas, determining a change in gas level over time, transmitting the gas level, and/or transmitting the change in gas level over time).

The microcontroller 422 can execute the gas self-test function 440 of the fire sensing device 400 responsive to a particular period of time passing since previously conducting a gas self-test function and/or responsive to receiving a command from the monitoring device 401.

The microcontroller 422 can send a command to the gas source 412 to release gas. The gas can be drawn past the gas sensor 414 via the variable airflow generator 416, the gas sensor 414 can measure the gas level, and determine the change in gas level over time. Once the gas level is measured, the fire sensing device 400 can store the test result (e.g., gas level and/or change in gas level over time) in memory 424 and/or send the test result to the monitoring device 401. The fire sensing device 400 and/or the monitoring device 401 can determine an airflow rate based on the change in gas level over time. In some examples, the fire sensing device 400 can determine whether the fire sensing device 400 is functioning properly based on the test result and/or the determined airflow rate and/or the monitoring device 401 can determine whether the fire sensing device 400 is functioning properly based on the test result and/or the determined airflow rate. For example, the monitoring device 401 can determine the fire sensing device 400 is functioning properly responsive to the fire response, detecting one or more gases, detecting one or more gas levels, determining the change in gas level over time exceeds a threshold level and/or determining the determined airflow rate exceeds a threshold airflow rate.

Figure 5:
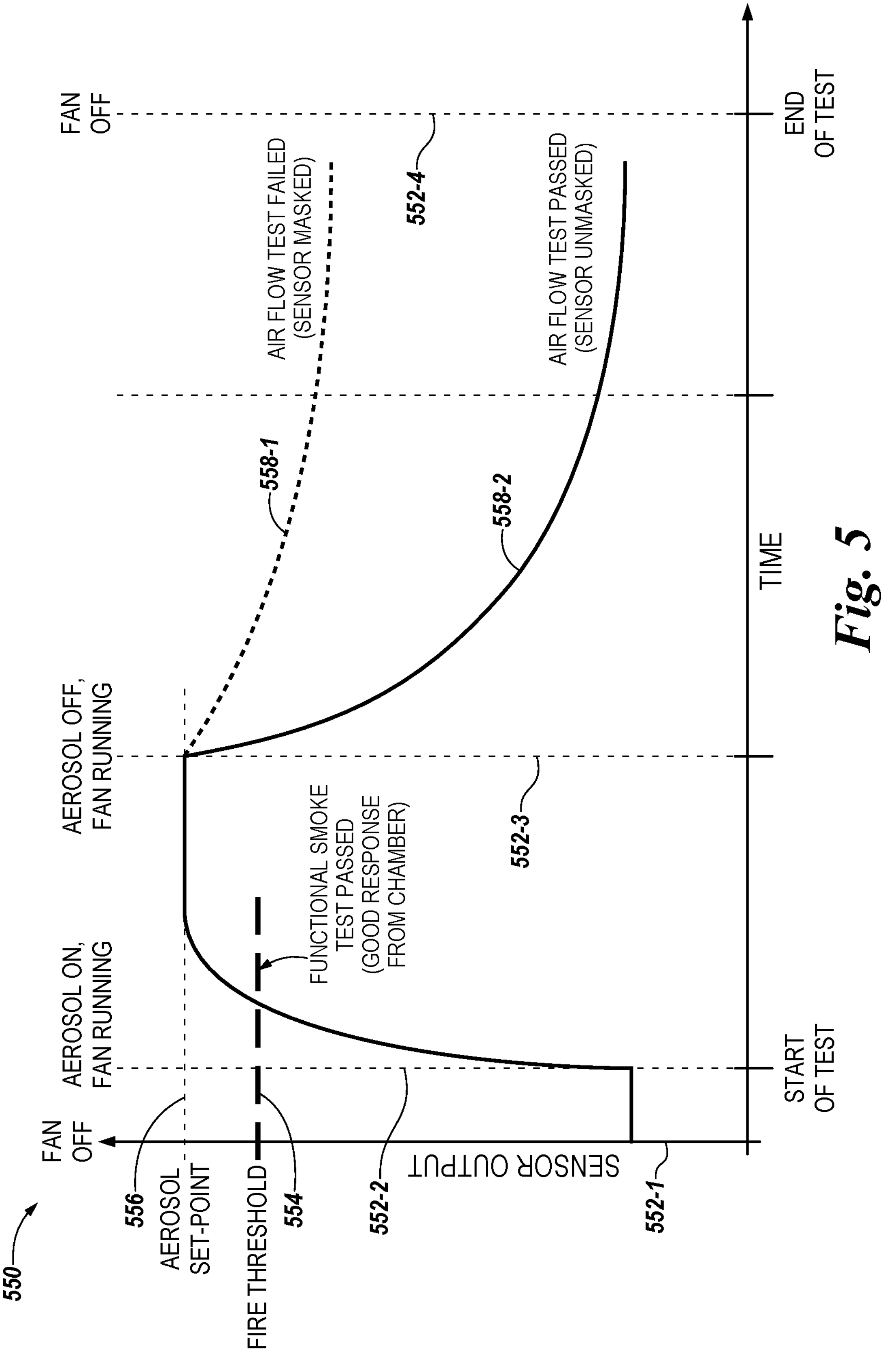
FIG. 5 illustrates a plot of example optical scatter chamber outputs used to determine whether a fire sensing device is functioning properly in accordance with an embodiment of the present disclosure.

FIG. 5 illustrates a plot (e.g., graph) 550 of example optical scatter chamber (e.g., sensor) outputs 558-1 and 558-2 used to determine whether a fire sensing device (e.g., fire sensing device 200 in FIG. 2) is functioning properly in accordance with an embodiment of the present disclosure. The optical scatter chamber outputs 558-1 and 558-2 can be a rate of reduction in aerosol density level.

In the example illustrated in FIG. 5, a variable airflow generator (e.g., variable airflow generator 216 in FIG. 2) and an adjustable particle generator (e.g., adjustable particle generator 202 in FIG. 2) can be powered off (e.g., turned off) at time 552-1. At time 552-2, the variable airflow generator and the adjustable particle generator can be powered on (e.g., turned on) to start a smoke self-test function, as previously described in connection with FIG. 2. When powered on the adjustable particle generator (e.g., fan) can generate particles (e.g., aerosol particles) and the generated particles can be mixed into a controlled aerosol density level by the variable airflow generator. The variable airflow generator can move the generated particles through an optical scatter chamber (e.g., optical scatter chamber 204 in FIG. 2). The optical scatter chamber can determine the airflow rate by measuring the rate at which the aerosol density level decreases after the aerosol density level has been generated.

Particles can be generated until a threshold aerosol density level (e.g., set-point) 556 is met. The threshold aerosol density level can be a sufficient aerosol density level to trigger a fire response (e.g., fire threshold) 554 from a properly functioning fire sensing device without saturating an optical scatter chamber, for example. Once the threshold aerosol density level 556 is met, the adjustable particle generator can stop generating particles at time 552-3 and the variable airflow generator can continue and/or increase the airflow, moving the generated particles through the optical scatter chamber.

The measured aerosol density level after the adjustable particle generator has stopped can reduce over time, as shown by the example optical scatter chamber outputs 558-1 and 558-2. In the example optical scatter chamber output 588-1, the aerosol density level remains higher than the example optical scatter chamber output 558-2 after the adjustable particle generator stops generating particles. The example optical scatter chamber output 588-1 illustrates an impeded airflow through the optical scatter chamber where the optical scatter chamber is masked, and the fire sensing device cannot function properly.

In the example optical scatter chamber output 588-2, the aerosol density level reduces more than the example optical scatter chamber output 588-1 after the adjustable particle generator stops generating particles. The example optical scatter chamber output 588-2 illustrates sufficient airflow through the optical scatter chamber where the optical scatter chamber is not masked, and the fire sensing device can function properly. Once it is determined whether the fire sensing device is functioning properly, at time 552-4, the smoke self-test function can be complete, and the variable airflow generator can be turned off.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-testing fire sensing device, comprising:
- a heat source configured to generate heat at a temperature sufficient to trigger a fire response;
- a heat sensor configured to measure a rate of reduction in a temperature in the self-testing fire sensing device; and
- a microcontroller comprising a memory and a processor configured to:
  - determine an airflow rate in the self-testing fire sensing device based on the measured rate of reduction in the temperature; and
  - determine whether the self-testing fire sensing device is functioning properly based on the determined airflow rate.

2. The device of claim 1, wherein the microcontroller is configured to determine whether the self-testing fire sensing device is functioning properly based on the determined airflow rate and the fire response.

3. The device of claim 1, wherein the microcontroller is configured to determine the self-testing fire sensing device is functioning properly responsive to the determined airflow rate exceeding a threshold airflow rate.

4. The device of claim 3, wherein the microcontroller is configured to determine the self-testing fire sensing device is not functioning properly responsive to the determined airflow rate failing to exceed the threshold airflow rate.

5. The device of claim 4, wherein the microcontroller is configured to transmit a fault notification to a monitoring device upon determining the self-testing fire sensing device is not functioning properly.

6. The device of claim 1, wherein the memory is configured to store a threshold temperature sufficient to trigger the fire response from a properly functioning heat sensing element.

7. The device of claim 1, wherein the memory is configured to store a period of time that has passed since heat was previously generated by the heat source.

8. The device of claim 7, wherein the microcontroller is configured to send a command to the heat source to generate heat responsive to the period of time that has passed since heat was previously generated by the heat source.

9. The device of claim 1, wherein the memory is configured to store the measured rate of reduction in temperature.

10. The device of claim 1, wherein the memory is configured to store the determined airflow rate.

11. A method for a self-testing fire sensing device, comprising:

generating heat using a heat source;

measuring a rate of reduction in a temperature in the self-testing fire sensing device using a heat sensor;

determining an airflow rate in the self-testing fire sensing device based on the measured rate of reduction in the temperature; and determining whether the self-testing fire sensing device is functioning properly based on the determined airflow rate.

12. The method of claim 11, wherein the method includes:

receiving a command at the self-testing fire sensing device; and generating the heat responsive to the command.

13. The method of claim 11, wherein the method includes detecting a rise in temperature using the heat sensor.

14. The method of claim 11, wherein the method includes drawing the heat past the heat sensor using a variable airflow generator.

15. The method of claim 14, wherein the method includes turning off the heat source.

16. The method of claim 15, wherein the method includes turning off the variable airflow generator.

17. A fire alarm system, comprising:

a self-testing fire sensing device configured to:

generate heat using a heat source;

measure a rate of reduction in a temperature in the self-testing fire sensing device using a heat sensor; and determine an airflow rate in the self-testing fire sensing device based on the measured rate of reduction in the temperature; and a monitoring device, including a microcontroller comprising a memory and a processor, configured to:

receive the determined airflow rate; and determine the self-testing fire sensing device is functioning properly responsive to the airflow rate exceeding a threshold airflow rate.

18. The system of claim 17, wherein the self-testing fire sensing device is configured to generate heat at a temperature sufficient to trigger a fire response.

19. The system of claim 18, wherein the monitoring device is configured to determine the self-testing fire sensing device is functioning properly responsive to the heat triggering the fire response.

20. The system of claim 17, wherein the self-testing fire sensing device is configured to generate heat using the heat source responsive to receiving a command from the monitoring device.

* * * * *